(12) United States Patent
Lee et al.

(10) Patent No.: US 11,748,943 B2
(45) Date of Patent: Sep. 5, 2023

(54) CLEANING DATASET FOR NEURAL NETWORK TRAINING

(71) Applicant: SONY GROUP CORPORATION, Tokyo (JP)

(72) Inventors: Jong Hwa Lee, San Diego, CA (US); Seunghan Kim, San Diego, CA (US); Gary Lyons, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 383 days.

(21) Appl. No.: 17/170,739

(22) Filed: Feb. 8, 2021

(65) Prior Publication Data
US 2021/0303923 A1 Sep. 30, 2021

Related U.S. Application Data

(60) Provisional application No. 63/003,015, filed on Mar. 31, 2020.

(51) Int. Cl.
G06K 9/62 (2022.01)
G06T 17/00 (2006.01)
(Continued)

(52) U.S. Cl.
CPC ............ *G06T 17/00* (2013.01); *G06F 18/214* (2023.01); *G06N 3/04* (2013.01); *G06N 3/08* (2013.01);
(Continued)

(58) Field of Classification Search
CPC .. G06T 17/00; G06T 7/50; G06T 7/73; G06T 15/04; G06T 2207/20081;
(Continued)

(56) References Cited

U.S. PATENT DOCUMENTS

| 7,551,755 | B1 | 6/2009 | Steinberg et al. |
| 2014/0043329 | A1 | 2/2014 | Wang et al. |
| 2017/0236057 | A1 | 8/2017 | Lane et al. |

FOREIGN PATENT DOCUMENTS

| CN | 110163953 | * 8/2019 | ........... G06T 15/005 |
| CN | 109377544 | * 12/2022 | ............. G06T 15/00 |

(Continued)

*Primary Examiner* — Jerome Grant, II
(74) *Attorney, Agent, or Firm* — CHIP LAW GROUP

(57) ABSTRACT

An electronic device and method of dataset cleaning is provided. The electronic device receives a dataset comprising a plurality of samples, of which a first sample comprises a 2D image of an object of interest and a 3D shape model of the object of interest. The electronic device determines 2D landmarks from the 2D image and extracts 3D landmarks from the 3D shape model. The electronic device computes an error between the determined 2D landmarks and corresponding 2D locations of the extracted 3D landmarks on the 2D image, based on an error metric. Thereafter, the electronic device determines the computed error to be above a threshold. Based on the determination that the computed error is above the threshold, the electronic device updates the dataset by a removal of the first sample from the dataset and trains a neural network on a task of 3D reconstruction, based on the updated dataset.

20 Claims, 6 Drawing Sheets

(51) Int. Cl.
*G06T 7/73* (2017.01)
*G06T 15/04* (2011.01)
*G06T 7/50* (2017.01)
*G06N 3/08* (2023.01)
*G06N 3/04* (2023.01)
*G06F 18/214* (2023.01)
*G06V 10/75* (2022.01)
*G06V 10/74* (2022.01)
*G06V 10/774* (2022.01)
*G06V 10/82* (2022.01)
*G06V 20/64* (2022.01)
*G06V 40/16* (2022.01)

(52) U.S. Cl.
CPC ............... *G06T 7/50* (2017.01); *G06T 7/73* (2017.01); *G06T 15/04* (2013.01); *G06V 10/757* (2022.01); *G06V 10/761* (2022.01); *G06V 10/774* (2022.01); *G06V 10/82* (2022.01); *G06V 20/647* (2022.01); *G06V 40/171* (2022.01); *G06T 2207/20081* (2013.01); *G06T 2207/20084* (2013.01); *G06T 2207/30201* (2013.01)

(58) Field of Classification Search
CPC . G06T 2207/20084; G06T 2207/30201; G06F 18/214; G06N 3/04; G06N 3/08; G06N 3/044; G06N 3/045; G06N 3/047; G06N 3/048; G06V 10/757; G06V 10/761; G06V 10/774; G06V 10/82; G06V 20/647; G06V 40/171
USPC ................................................ 382/157
See application file for complete search history.

(56) References Cited

FOREIGN PATENT DOCUMENTS

| JP | 2001273495 | * 10/2001 | ............. G06T 15/00 |
| WO | WO2020042975 | * 3/2020 | ............. G06T 19/20 |

* cited by examiner

(12) United States Patent
US 11,748,943 B2

CLEANING DATASET FOR NEURAL NETWORK TRAINING

REFERENCE

This application claims priority to U.S. Provisional Patent Application Ser. No. 63/003,015 filed on Mar. 31, 2020, the entire content of which is hereby incorporated herein by reference.

FIELD

Various embodiments of the disclosure relate to data cleaning for neural network training. More specifically, various embodiments of the disclosure relate to an electronic device and method of cleaning a dataset for training a neural network model on a task of 3D reconstruction.

BACKGROUND

In a machine learning (ML) or a deep learning (DL) pipeline, data cleaning may be considered as a key process before an ML or DL model is trained. Datasets, for example, image datasets, are popularly used for supervised learning. Typically, in supervised learning, an ML or DL model may be trained to map an input to an output based on sample input-output pairs in a dataset. The accuracy of training may depend on several factors, one of which relates to a number of bad (e.g., erroneous) samples in the dataset. For example, a face dataset may include face images and face feature points mapped to each face image. If there are several face images for which feature points are not correctly mapped to the face in respective face images, then the quality of the dataset may be considered as poor and the training of any ML or DL model on such a dataset may not provide a desired quality in results. Conventionally, many developers choose to perform dataset cleaning manually, where they have to verify a bad sample with their own eyes. Manual clearing of dataset may not be desirable, especially if the dataset is large or if there is a human bias in analysis of the dataset for bad samples.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method of cleaning a dataset for training a neural network model is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for cleaning a dataset for training of a neural network model on a task of three-dimensional (3D) reconstruction. Exemplary aspects of the disclosure provide an electronic device that may be configured to receive a dataset. A sample of the dataset may include a 2D image of an object of interest (for example, a face of a human subject), a 3D shape model of the object of interest, and texture mapping information between the object of interest of the 2D image and the 3D shape model. The electronic device may determine 2D landmarks from the 2D image. The determined 2D landmarks may correspond to shape-features (such as eyes, nose and jaw line) of the object of interest. The electronic device may extract 3D landmarks from the 3D shape model of the received dataset and may compute an error between the 2D landmarks and corresponding 2D locations of the extracted 3D landmarks on the 2D image. Such computation may be based on an error metric (for example, Root Mean Square (RMS) error). Based on a determination that the computed error is more than a threshold, the electronic device may update the received dataset by a removal of the sample from the received dataset. The electronic device may train the neural network model on a task of 3D reconstruction from a single 2D image, based on the updated dataset.

In conventional methods, a dataset may be evaluated manually to filter out bad samples. Manual removal of bad or undesirable samples may be time consuming and may make the whole process of dataset cleaning inefficient. In contrast, the present disclosure defines an error metric to search for bad samples from the dataset and removes the bad samples directly from the dataset. Use of the error metric, for example, to measure errors in mapping of face landmarks, prevents a need for manual analysis of the dataset and mitigates a risk of human bias in determination of bad samples. Models or neural networks trained on such an updated dataset may be more accurate as compared to a model or network which may be trained directly on the received dataset.

Figure 1:
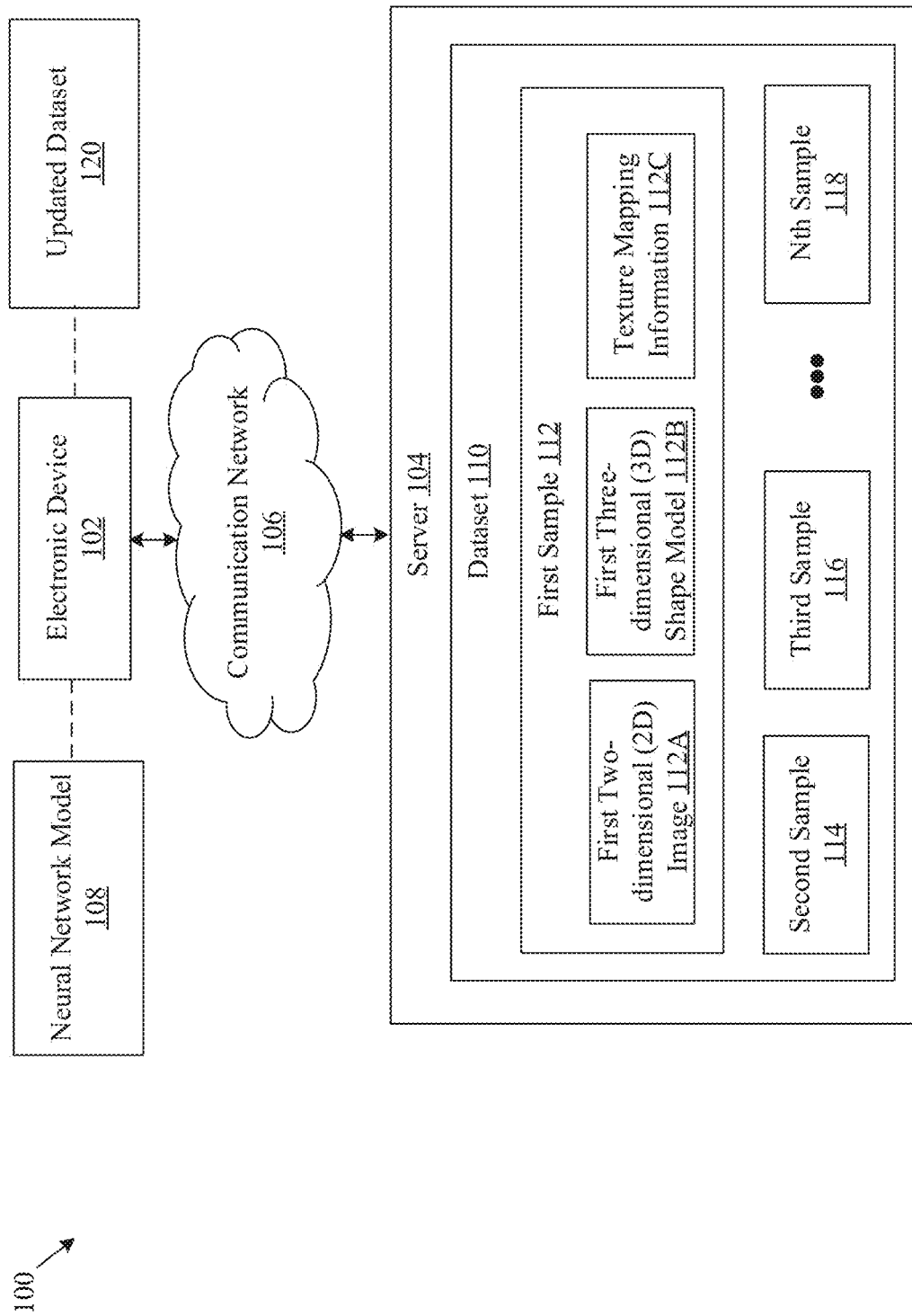
FIG. 1 is a block diagram that illustrates an exemplary network environment for dataset cleaning and training a neural network model on a task of three-dimensional (3D) reconstruction, in accordance with an embodiment of the disclosure.

FIG. 1 is a block diagram that illustrates an exemplary network environment for cleaning a dataset for training a neural network model on a task of three-dimensional (3D) reconstruction, in accordance with an embodiment of the disclosure. With reference to FIG. 1, there is shown a network environment 100. The network environment 100 may include an electronic device 102 and a server 104. The network environment 100 may further include a communication network 106. The electronic device 102 and the server 104 may communicate with each other via the communication network 106. The network environment 100 may further include a neural network model 108, which may be trained on the electronic device 102.

The server 104 may store a dataset 110, for example. The dataset 110 may include a plurality of samples, such as a first sample 112, a second sample 114, a third sample 116, and an Nth sample 118. The first sample 112 may include a first two-dimensional (2D) image 112A, a first three-dimensional (3D) shape model 112B and texture mapping information 112C.

The electronic device 102 may include suitable logic, circuitry, and interfaces that may be configured to execute a sample-wise analysis of the dataset 110 and may update the dataset 110 by removal of one or more samples (i.e. bad samples) from the dataset 110. The electronic device 102 may be further configured to train the neural network model 108 on a task of 3D reconstruction from a single 2D image, based on the updated dataset 120. Examples of the electronic device 102 may include, but are not limited to, a computing device, a smartphone, a mobile phone, a gaming device, a mainframe machine, a server, a computer workstation, and/or a consumer electronic (CE) device.

The server 104 may include suitable logic, circuitry, and interfaces, and/or code that may be configured to store the dataset 110 and/or information related to the dataset 110 or the neural network model 108. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and electronic device 102 as two separate entities. In certain embodiments, the functionalities of the server 104 may be incorporated in its entirety or at least partially in the electronic device 102, without departing from the scope of the disclosure.

The communication network 106 may include a communication medium through which the electronic device 102 and the server 104 may communicate with each other. For example, the electronic device 102 may receive the dataset 110 from the server 104, via the communication network 106. The communication network 106 may be one of a wired connection or a wireless connection. Examples of the communication network 106 may include, but are not limited to, the Internet, a cloud network, a Wireless Fidelity (Wi-Fi) network, a mobile wireless network (such as Long-term Evolution or 5th Generation New Radio (5G NR)), a Personal Area Network (PAN), a Local Area Network (LAN), or a Metropolitan Area Network (MAN). Various devices in the network environment 100 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The neural network model 108 may be a computational network or a system of artificial neurons, arranged in a plurality of layers, as nodes. The plurality of layers of the neural network model 108 may include an input layer, one or more hidden layers, and an output layer. Each layer of the plurality of layers may include one or more nodes (or artificial neurons, represented by circles, for example). Outputs of all nodes in the input layer may be coupled to at least one node of the hidden layer(s). Similarly, inputs of each hidden layer may be coupled to outputs of at least one node in other layers of the neural network model 108. Outputs of each hidden layer may be coupled to inputs of at least one node in other layers of the neural network model 108. Node(s) in the final layer may receive inputs from at least one hidden layer to output a result. The number of layers and the number of nodes in each layer may be determined from parameters of the neural network model 108. Such parameters may be set before, while, or after training the neural network model 108 on the updated dataset 120.

Each node of the neural network model 108 may correspond to a mathematical function (e.g., a sigmoid function or a rectified linear unit) with a set of parameters, tunable during training of the neural network model 108. The set of parameters may include, for example, a weight parameter, a regularization parameter, and the like. Each node may use the mathematical function to compute an output based on one or more inputs from nodes in other layer(s) (e.g., previous layer(s)) of the neural network model 108. All or some of the nodes of the neural network model 108 may correspond to same or a different same mathematical function.

In training of the neural network model 108, one or more parameters of each node of the neural network model 108 may be updated based on whether an output of the final layer for a given input (from the updated dataset 120) matches a correct result based on a loss function for the neural network model 108. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

In an embodiment, the neural network model 108 may include electronic data, which may be implemented as, for example, a software component of an application executable on the electronic device 102. The neural network model 108 may rely on libraries, external scripts, or other logic/instructions for execution by a processing device, such as the electronic device 102. The neural network model 108 may enable a computing device, such as the electronic device 102 to perform one or more operations associated with 3D reconstruction of an object of interest (for example, a 3D human face) from a single 2D image (for example, an image of a face of the human subject). Additionally, or alternatively, the neural network model 108 may be implemented using hardware including a processor, a co-processor (such as an Artificial Intelligence (AI) accelerator chip), a microprocessor, a field-programmable gate array (FPGA), or an application-specific integrated circuit (ASIC). In some embodiments, the neural network model 108 may be implemented using a combination of both hardware and software.

Examples of the neural network model 108 may include, but are not limited to, a deep neural network (DNN), a convolutional neural network (CNN), a CNN-recurrent neural network (CNN-RNN), R-CNN, Fast R-CNN, Faster R-CNN, a You Only Look Once (YOLO) network, CNN+ANN, a Generative Adversarial Network (GAN), and/or a combination of such networks. In certain embodiments, the neural network model 108 may be based on a hybrid architecture of multiple Deep Neural Networks (DNNs).

In operation, the electronic device 102 may be configured to receive the dataset 110. The dataset 110 may be received from the server 104 or from any data source, such as, but not limited to, a workstation, a storage drive, a smartphone, or a combination thereof. The dataset 110 may include a plurality of samples, such as the first sample 112, the second sample 114, the third sample 116 and the Nth sample 118. The first sample 112 may include the first 2D image 112A of the object of interest, the first 3D shape model 112B of the object of interest and the texture mapping information 112C between the object of interest of the first 2D image 112A and the first 3D shape model 112B. For example, the object of interest may be a face of a human subject. The object of interest may belong to a particular object class, to which all or most of images in the received dataset 110 may belong. For example, if the object of interest is a human face, all or most of the 2D images and the corresponding 3D shape models in the dataset 110 may be face images of one or more human subjects.

In an embodiment, the object of interest may be an animate object or an inanimate object. Examples of the animate objects may include, but are not limited to, a face of a human subject, a body of the human subject, or an anatomical portion different from the body and the face of the human subject. Examples of the inanimate objects may include, but are not limited to, toys, equipment, infrastructure, such as buildings or houses, or furniture.

In order to clean the dataset 110, the electronic device 102 may iteratively execute a set of operations to compute an error and to classify each sample of the dataset 110 as a desirable sample (i.e. a good sample) or an undesirable sample (or a bad sample). Such operations are briefly described herein for the first sample 112 of the dataset 110.

The electronic device 102 may be configured to determine 2D landmarks from the first 2D image 112A of the first sample 112. The determined 2D landmarks may correspond to shape-features of the object of interest. For example, if the first 2D image 112A is a face image of a human subject, the 2D landmarks may be detected on shape-features, such as of eyes, nose, lips, eyebrows, and jawline in the first 2D image 112A of the object of interest (such as the face of a human subject). Details of the determination of the 2D landmarks are further provided, for example, in FIG. 3A.

The electronic device 102 may extract 3D landmarks from the first 3D shape model 112B of the received dataset 110. The first 3D shape model 112B may be a 3D model of the object of interest of the first 2D image 112A. In some embodiments, the first 3D shape model 112B may be obtained after fitting a 3D morphable model (such as a Basel model) to features of the objects of interest in the first 2D image 112A. By way of example, and not limitation, such a model may be a mean-shape model of several 3D meshes associated with an object type/class. Each landmark of the extracted 3D landmarks may include 3D coordinates, such as x, y, and z coordinates of a 3D point, which lies on a corresponding shape-feature (for example, a 3D point on nose) of the first 3D shape model 112B. Details of the extraction of the 3D landmarks are further provided for example at 316 in FIG. 3A.

In an embodiment, for each 3D landmark, a corresponding 2D location on the first 2D image 112A may be determined. Thereafter, the electronic device 102 may compute a first error between the determined 2D landmarks and the corresponding 2D locations of the extracted 3D landmarks on the first 2D image 112A. The computed first error may be based on an error metric, such as a Root Mean Square Error (RMSE) metric. In case of RMSE metric, the first error may be computed as a RMSE between the determined 2D landmarks and the corresponding 2D locations of the extracted 3D landmarks. Details of the computation of the first error are further provided for example at 318 in FIG. 3B.

The electronic device 102 may be further configured to determine the computed first error to be above a threshold. The threshold may be set based on a maximum acceptable distance between a 2D landmark and a corresponding 2D location of an extracted 3D landmark on a face image (such as the first 2D image 112A). The lower the computed first error, the higher will be the similarity between the shape-features of the first 2D image 112A and that of the first 3D shape model 112B. As the computed first error is above the threshold, the first sample 112 may not be a good sample or example for training the neural network model 108. Details of the determination of the first error to be above the threshold are further provided for example at 320 in FIG. 3B.

Based on the determination that the computed first error is more than the threshold, the electronic device 102 may update the received dataset 110. The update may include a removal of the first sample 112 from the received dataset 110. Similar to that of the first sample 112, all other samples of the received dataset 110 may be evaluated to determine whether or not respective errors (based on the error metric) are above the threshold. The electronic device 102 may output an updated dataset 120, which may exclude one or more samples for which the computed error is more than the threshold.

The electronic device 102 may train the neural network model 108 on a task of 3D reconstruction from a single 2D image, based on the updated dataset 120. Details of the training of the neural network model 108 are further provided, for example, in FIG. 3B. Once the training is done, the trained neural network model 108 may reconstruct a textured or an untextured 3D model of an object of interest (such as a human face) for a given input which may include a 2D image of the object of interest.

Figure 2:
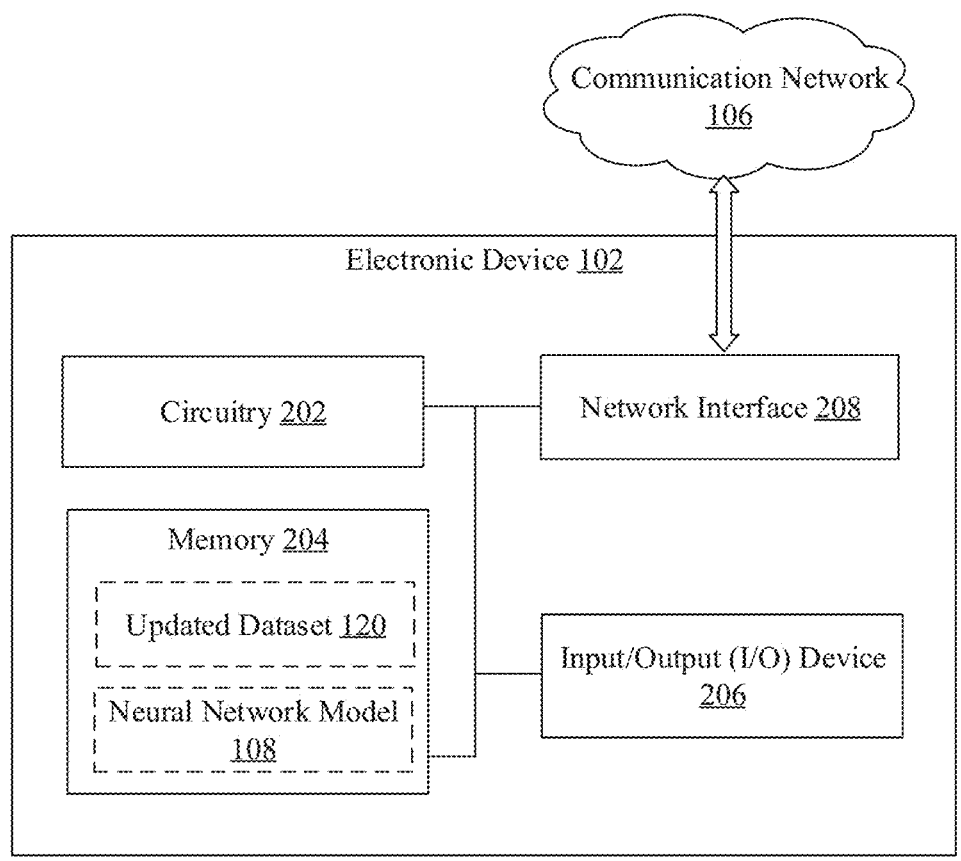
FIG. 2 is a block diagram that illustrates an exemplary electronic device for cleaning a dataset to train a neural network model on a task of 3D reconstruction, in accordance with an embodiment of the disclosure.

FIG. 2 is a block diagram that illustrates an exemplary electronic device for cleaning a dataset to train a neural network model on a task of 3D reconstruction, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, the Input/Output (I/O) device 206, and a network interface 208. The circuitry 202 may be communicatively coupled to the memory 204, the I/O device 206, and the network interface 208. In some embodiments, the memory 204 may include the updated dataset 120 and the neural network model 108.

The circuitry 202 may include suitable logic, circuitry, and interfaces that may be configured to execute program instructions associated with different operations to be executed by the electronic device 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the program instructions to be executed by the circuitry 202. The memory 204 may be configured to store the updated dataset 120 and the neural network model 108. The memory 204 may be also configured to store the dataset 110 which may include the first sample 112, the second sample 114, the third sample 116 and the Nth sample 118. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user and provide an output based on the received input. The I/O device 206 which may include various input and output devices, may be configured to communicate with the circuitry 202. For example, the electronic device 102 may receive a user input via the I/O device 206 to receive the dataset 110 from the server 104. The I/O device 206, such as a display may render inputs and/or outputs of the neural network model 108 before or after the neural network model 108 is trained. Examples of the I/O device 206 may include, but are not limited to, a touch screen, a display device, a keyboard, a mouse, a joystick, a microphone, and a speaker.

The network interface 208 may include suitable logic, circuitry, and interfaces that may be configured to facilitate communication between the circuitry 202 and the server 104, via the communication network 106. The network interface 208 may be implemented by use of various known technologies to support wired or wireless communication of the electronic device 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIGS. 3A and 3B.

Figure 3A:
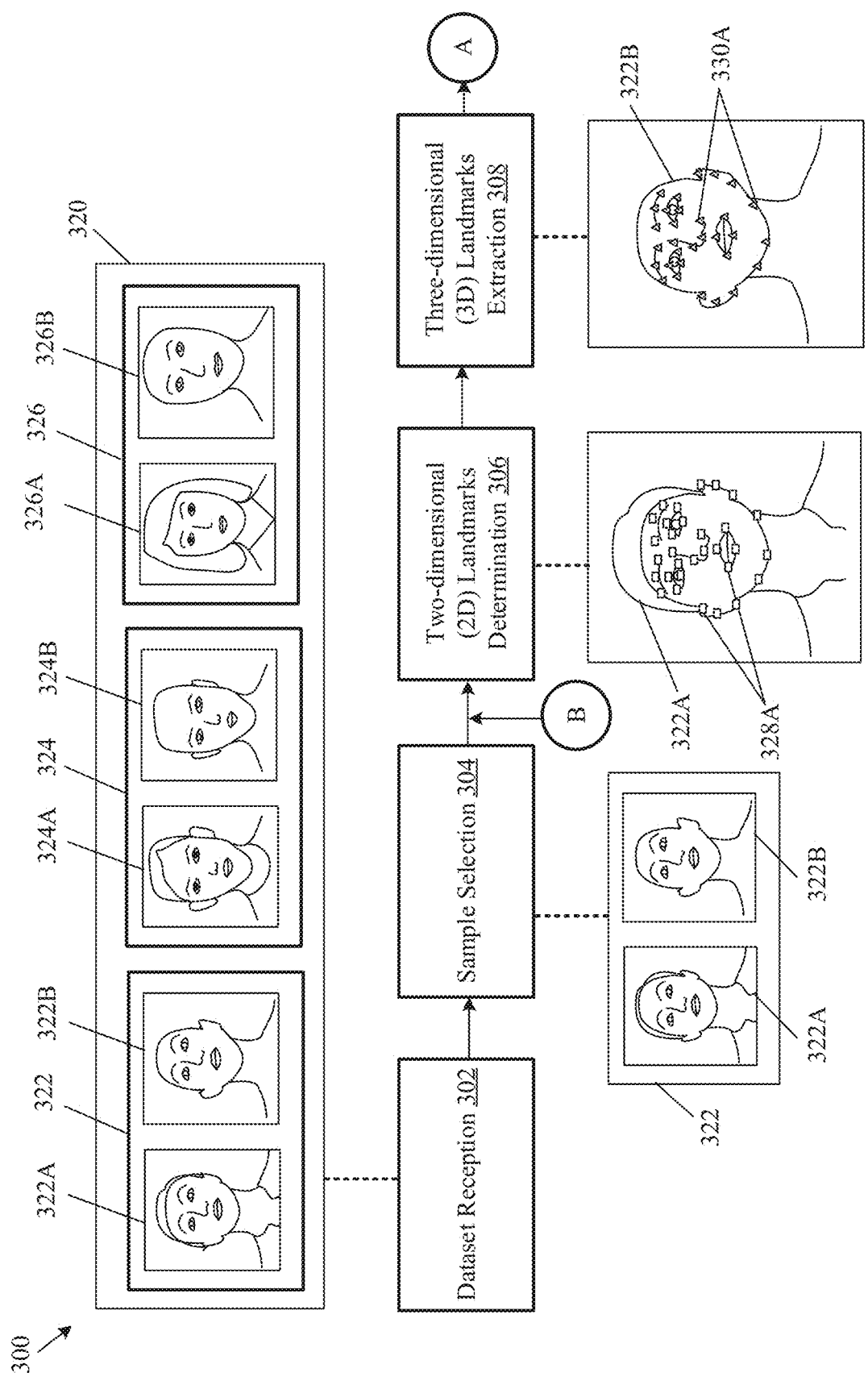
FIGS. 3A and 3B, collectively, illustrate exemplary operations for cleaning a dataset to train a neural network model on a task of 3D reconstruction, in accordance with an embodiment of the disclosure.
Figure 3B:
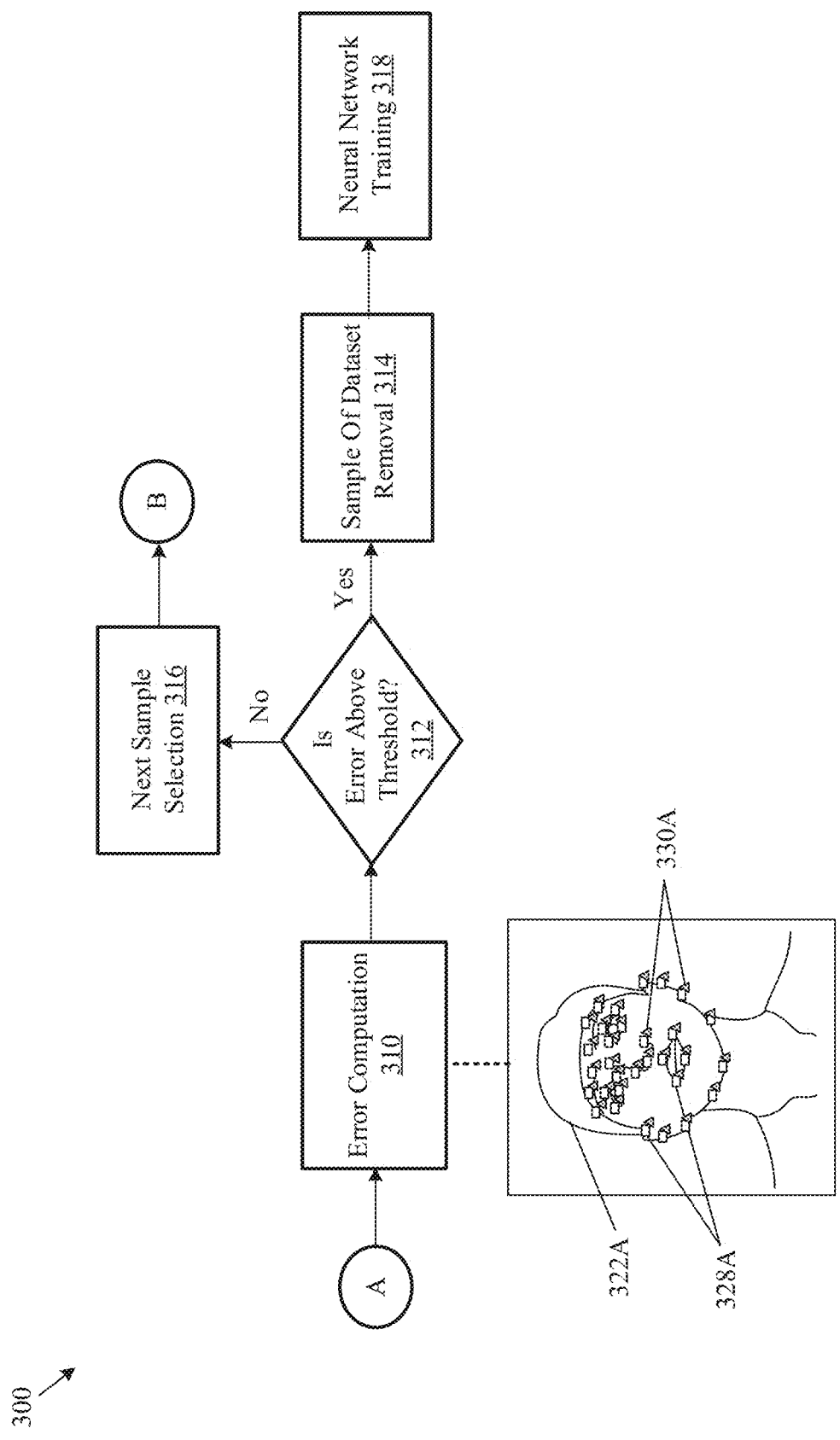

FIGS. 3A and 3B, collectively, illustrate exemplary operations for cleaning a dataset to train a neural network model on a task of 3D reconstruction, in accordance with an embodiment of the disclosure. FIGS. 3A and 3B are explained in conjunction with elements from FIG. 1 and FIG. 2. With reference to FIGS. 3A and 3B, there is shown a block diagram 300 that illustrates exemplary operations from 302 to 318, as described herein. The exemplary operations illustrated in block diagram 300 may start at 302 and may be performed by any computing system, apparatus, or device, such as by the electronic device 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, a dataset 320 which may include a plurality of samples may be received. In accordance with an embodiment, the circuitry 202 may be configured to receive the dataset 320. In an embodiment, the dataset 320 may be received from a server (such as the server 104) via the communication network 106. In another embodiment, the dataset 320 may be generated and stored on the electronic device 102.

The dataset 320 may include a first sample 322 which may include a first 2D image 322A of an object of interest and a first 3D shape model 322B of the object of interest. The first sample 322 may include the texture mapping information 112C (not shown in FIG. 3A) between the object of interest of the first 2D image 322A and the first 3D shape model 322B. The texture mapping information 112C may include a dense correspondence for color or texture between the first 3D shape model 322B and the first 2D image 322A. In some embodiments, the texture mapping information may include a 2D texture map (e.g., in terms of UV coordinates) to represent a texture or appearance of the object of interest (such as the face of the human subject). In these or other embodiments, the texture mapping information may include color information of a surface of the object of interest. The dataset 320 may further include a second sample 324, a third sample 326, and so on. Similar to the first sample 322, the second sample 324 may include a second 2D image 324A and a second 3D shape model 324B of an object in the second 2D image 324A. Similarly, the third sample 326 may include a third 2D image 326A and a third 3D shape model 326B of an object in the third 2D image 326A.

In accordance with an embodiment, the object of interest may be one of an inanimate object or an animate object. Examples of the animate object may include, but are not limited to, a body of a human subject, a face of the human subject, any anatomical portion different from the body and the face of the human subject, or an animal, such as a dog or a cat. Examples of the inanimate object may include, but are not limited to, a chair, a car, a toy, or an infrastructure, such as buildings. As shown, for example, the object of interest in the first 2D image 322A is the face of a human subject, and the corresponding first 3D shape model 322B is a 3D face model of the human subject.

In some embodiments, the plurality of samples in the dataset 320 may include several object variations to have a balanced composition and to avoid any bias in the neural network model 108 (which may be trained on such dataset 320). For instance, if the object of interest is the human face, variations may mean that face images of a population set may include people of different genders, age groups, race, color, or ethnicity. For example, the object of interest in the first sample 322 may be a face of a 30 years old American male. The object of interest in the second sample 324 may be a face of a 40 years old Asian female. The object of interest in the third sample 326 may be a face of 20 years old African male.

At 304, the first sample 322 of the dataset 320 may be selected. In accordance with an embodiment, the circuitry 202 may be configured to select the first sample 322 of the dataset 320 to analyze the first sample 322. As shown, for example, the first sample 322 includes the first 2D image 322A of a person's face, the first 3D shape model 322B of the person's face, as included in the first 2D image 322A. A face texture map for the person's face may also be included in the first sample 322, for example.

At 306, 2D landmarks 328A may be determined. In accordance with an embodiment, the circuitry 202 may be configured to determine the 2D landmarks 328A from the first 2D image 322A. Such determination may be done based on application of techniques, such as, but not limited to, a neural network-based method, Histogram of Oriented Gradients (HOG) and Support Vector Machine (SVM), Local Binary Patterns (LBP) cascade, or HAAR on the first 2D image 322A. Details of such techniques have been omitted from the disclosure for the sake of brevity. The determined 2D landmarks 328A may correspond to shape-features of the object of interest. For example, if the object of interest is a face, such shape-features may include eyes, nose, ears, lips, jawline, and the like. Each 2D landmark of the determined 2D landmarks 328A may be represented in terms of 2D image coordinates. Additionally, an index value may be assigned to each of the determined 2D landmarks 328A. For example, if there are 68 landmarks on the first 2D image 322A, each of the 68 landmarks may be assigned a unique index from a set of indices (1, 2, 3 . . . 68).

At 308, 3D landmarks 330A may be extracted from the first 3D shape model 322B of the first sample 322. In accordance with an embodiment, the circuitry 202 may be configured to extract the 3D landmarks 330A from the received first 3D shape model 322B of the first sample 322. The 3D landmarks 330A may determine corresponding 3D locations of shape-features, such as eyes, nose, lips, ears, jaw line of the first 3D shape model 322B in a 3D space. For example, each 3D landmark of the extracted 3D landmarks 304B may include 3D coordinates, such as x, y, and z coordinates of a 3D point on a corresponding shape-feature (for example, a 3D point on nose) of the first 3D shape model 322B. If 68 2D landmark are determined on the first 2D image 322A, then 68 corresponding 3D landmarks may be extracted from the first 3D shape model 322B.

At 310, an error may be computed between the determined 2D landmarks 328A and the corresponding 2D locations of the extracted 3D landmarks 330A. In accordance with an embodiment, the circuitry 202 may be configured to compute the first error between the determined 2D landmarks 328A and the corresponding 2D locations of the extracted 3D landmarks 330A. Before the first error is computed, each of the extracted 3D landmarks 330A may be mapped to their corresponding 2D locations on the first 2D image 322A.

The first error may be indicative of an amount of mismatch between the shape-features of the first 3D shape model 322B corresponding shape-features of the object of interest (such as the face) in the first 2D image 322A. The first error may be computed based on an error metric, such as a Root Mean Square Error (RMSE). Other examples of the error metric may include, but are not limited to, a sum of absolute differences (SAD), a mean squared error (MSE), a Mean Absolute Scaled Error (MASE) metric, a Mean Absolute Percentage Error (MAPE), a Symmetric Mean Absolute Percentage Error (SMAPE), or least square error (LSE). The error metric may be utilized to measure a deviation between a 2D location of a 2D landmark (from among the 2D landmarks 328A) and a corresponding 2D location of a 3D landmark (from among the extracted 3D landmarks 330A).

In case the RMSE metric is used, the first error may be computed as an RMSE between the determined 2D landmarks 328A and the corresponding 2D locations of the extracted 3D landmarks 330A on the first 2D image 322A. The RMSE may be computed, for example, by using equation (1), which may be given as follows:

$$RMSE = \sqrt{\frac{1}{n}\sum_{i=1}^{n}(y_j - \hat{y}_j)^2} \quad (1)$$

where n is total number of the 2D landmarks or the 3D landmarks, $y_1$ corresponds to a 2D location of a $j^{th}$ 2D landmark of the 2D landmarks 328A, and $\hat{y}_j$ corresponds to a 2D location of a $j^{th}$ 3D landmark of the 3D landmarks 330A.

The RMSE may be indicative of a difference or a deviation in the 2D location of the 2D landmarks 328A and the 2D location of the 3D landmarks 330A. Higher the value of RMSE, higher may be a difference between the 2D landmarks 328A and the 2D location of the 3D landmarks 330A and lower may be a similarity between the shape-features of the object of interest (such as the face) in the first 2D image 322A and corresponding shape-features of the first 3D shape model 322B. Also, higher the value of RMSE, higher may be the first error and lower may be the accuracy of the first 3D shape model 322B.

At 312, it may be determined whether the first error is above a threshold. In an embodiment, the circuitry 202 may determine whether or not the first error is above the threshold. In case the first error is determined to be above the threshold, control may pass to 314. Otherwise, control may pass to 316.

At 314, the dataset 320 may be updated by removal of the first sample 322 from the dataset 320. In accordance with an embodiment, the circuitry 202 may be configured to update the dataset 320 by removal of the first sample 322 from the dataset 320. Such removal may be based on the determination that the computed first error is more than the threshold. Thereafter, operations from 302 to 314 may be repeated for all the remaining samples in the dataset 320 so as to filter out or remove bad samples for which respective errors (such as RMSE) is above the threshold.

At 316, a next sample of the dataset 320 may be selected. In accordance with an embodiment, the circuitry 202 may be configured to select a next sample, such as the second sample 324 of the dataset 320. The second sample 324 may be selected based on a determination that the first error for the first sample 322 is below the threshold. Thereafter, operations from 306 to 314 may be executed for the second sample 324 and the dataset 320 may be further updated based on a second error corresponding to the second sample 324.

At 318, the neural network model 108 may be trained. In accordance with an embodiment, the circuitry 202 may be configured to train the neural network model 108 on the task of 3D reconstruction from a single 2D image. Such training may be executed based on the updated dataset (for example, based on the update at 314). By way of example, and not limitation, for the first sample 322 of the updated dataset, the neural network model 108 may be trained to learn a first mapping between the first 2D image 322A of the object of interest and the first 3D shape model 322B of the object of interest. The neural network model 108 may be further trained to learn a second mapping of texture (i.e. a dense correspondence) between the first 3D shape model 322B and the first 2D image 322A.

In an embodiment, the circuitry 202 may feed the first 2D image 322A, which may be annotated with the 2D landmarks 328A as an input to a first network of the neural network model 108. The first network of the neural network model 108 may be trained to learn a correspondence (or a mapping) between the 2D landmarks 328A of the first 2D image 322A and the 3D landmarks 330A of the first 3D shape model 322B. The first network of the neural network model 108 may be configured to output a 3D shape model of the object of interest, based on the learned correspondence. The output, i.e. the 3D shape model may fit the shape-features of the object of interest in the first 2D image 322A. In training, information, such as the first 3D shape model 322B and the 3D landmarks 330A in the first sample 322 of the updated dataset may be used as ground truth to update the parameters, such as neural weights of the first network. Based on the accuracy of the output, the weights may be adjusted for each input to the first network of the neural network model 108.

The neural network model 108 may also include a second network, which may be trained to learn a dense correspondence of texture between the first 2D image 322A and the first 3D shape model 322B. From the updated dataset, the texture mapping information 112C may be used as a ground truth to measure loss/accuracy of the second network and to update parameters, such as weights of the second network. Once trained, the second network may be configured to output texture mapping information for an untextured 3D shape model. In some instances, the neural network model 108 may output a textured 3D shape model based on outputs of the first network and the second network for an input 2D image. The neural network model 108, when trained, may be used to output accurate 3D shape models, without use of complex texture mapping techniques, thereby reducing the work in generating 3D models.

It should be noted that the human faces in the dataset 320 are presented merely as examples of the object of interest. The present disclosure may be also applicable to other types of objects of interest, such as other animate objects or inanimate objects. A description of other types of objects of interest has been omitted from the disclosure for the sake of brevity.

Figure 4:
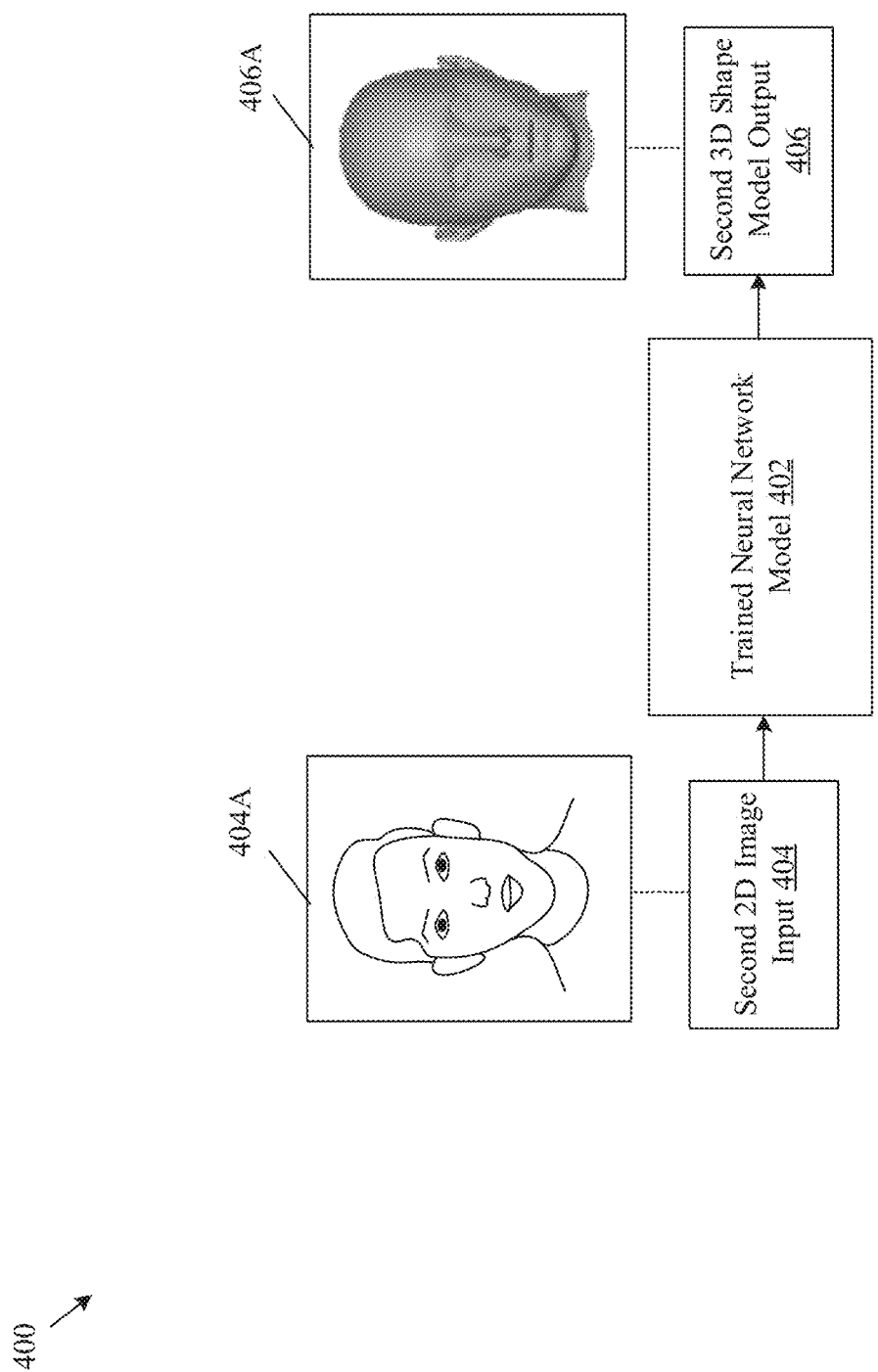
FIG. 4 is a block diagram that illustrates exemplary operations associated with a trained neural network model, in accordance with an embodiment of the disclosure.

FIG. 4 is a block diagram that illustrates exemplary operations associated with a trained neural network model, in accordance with an embodiment of the disclosure. FIG. 4 is explained in conjunction with elements from FIGS. 1, 2, 3A and 3B. With reference to FIG. 4, there is shown a block diagram 400 that illustrates a neural network model 402. The neural network model 402 may be an exemplary implementation of the neural network model 108 and may be trained on the updated dataset 120 (as also described in FIGS. 3A and 3B). The block diagram 400 illustrates exemplary operations 404 and 406, as described herein. The exemplary operations illustrated in block diagram 400 may start at 404 and may be performed by any computing system, such as by the circuitry 202 of FIG. 2.

At 404, the neural network model 402 (trained at 326, for example) may receive a second 2D image 404A of the object of interest as an input. In some embodiments, the circuitry 202 may input the second 2D image 404A to the neural network model 402. The second 2D image 404A may be a part of an unseen dataset of images (for example, human face images which may have not been used in past in the training of the neural network model 402). The second 2D image 404A may not be a part of the updated dataset 120 on which the neural network model 402 may be trained. As shown, for example, the second 2D image 404A may be an image of a human face different from that in the first 2D image 322A.

At 406, the neural network model 402 may output a second 3D shape model 406A corresponding to the object of interest in the second 2D image 404A. The output may be based on the input (i.e. the second 2D image 404A). The second 3D shape model 406A may resemble the shape-features and the texture on the object of interest in the second 2D image 404A.

Although illustrated with discrete blocks, the exemplary operations associated with one or more blocks of the block diagram 400 may be divided into additional blocks, combined into fewer blocks, or eliminated, depending on implementation of the exemplary operations.

Figure 5:
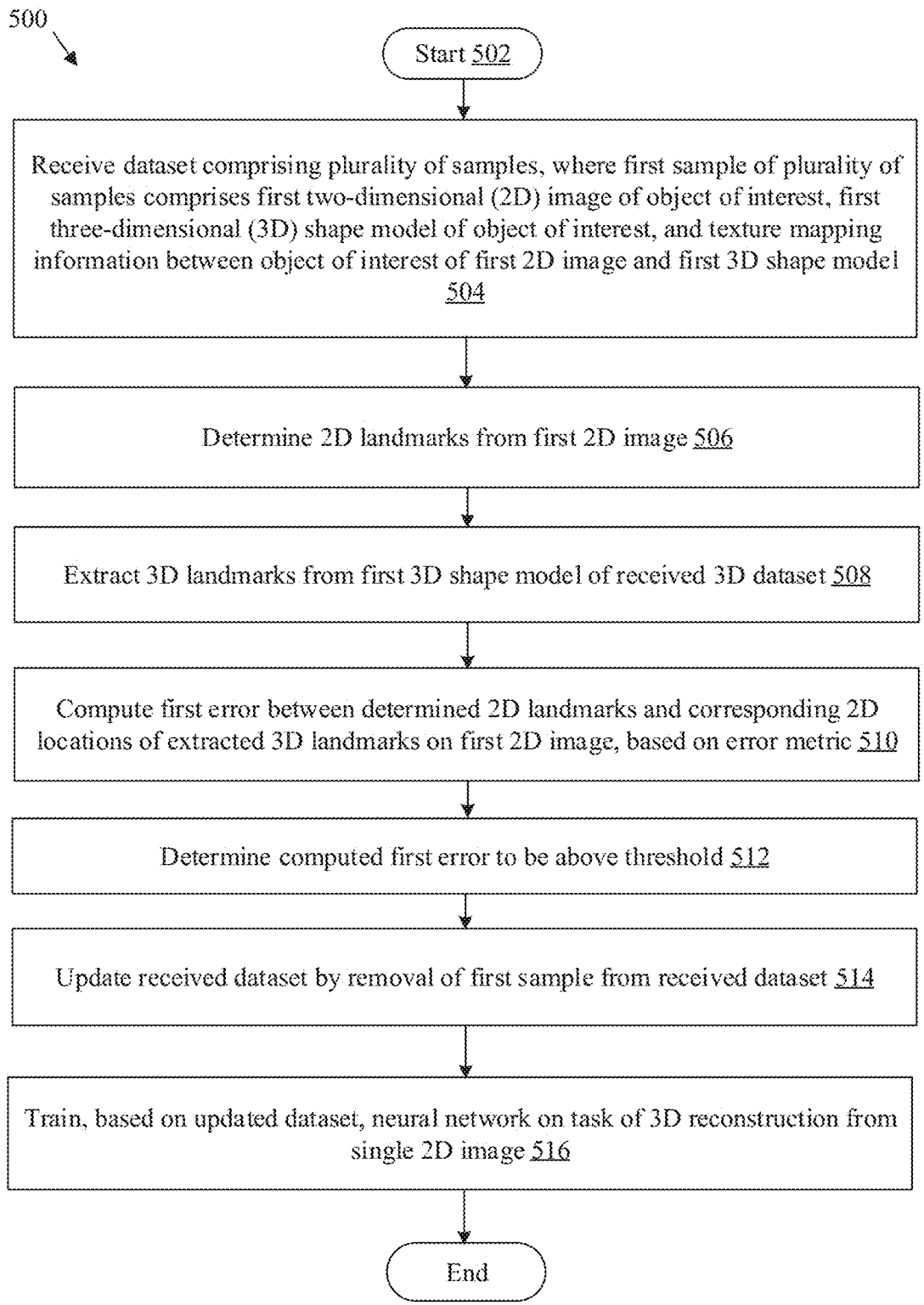
FIG. 5 is a flowchart that illustrates an exemplary method for cleaning a dataset to train a neural network model on a task of 3D reconstruction, in accordance with an embodiment of the disclosure.

FIG. 5 is a flowchart that illustrates an exemplary method for cleaning a dataset to train a neural network model on a task of 3D reconstruction, in accordance with an embodiment of the disclosure. FIG. 5 is explained in conjunction with elements from FIGS. 1, 2, 3A, 3B, and 4. With reference to FIG. 5, there is shown a flowchart 500. The method illustrated in the flowchart 500 may be executed by any computing system, such as by the electronic device 102 or the circuitry 202. The method may start at 502 and proceed to 504.

At 504, a first sample (such as the first sample 322) of the plurality of samples may be received. In accordance with an embodiment, the circuitry 202 may be configured to receive the first sample 322 of the plurality of samples of the dataset 320. The first sample 322 may include a first two-dimensional (2D) image (such as the first 2D image 322A) of an object of interest, a first three-dimensional (3D) shape model (such as the first 3D shape model 322B) of the object of interest, and texture mapping information between the object of interest of the first 2D image 322A and the first 3D shape model 322B. Details of the reception of the first sample 322 of the dataset 320 are further provided for example in FIG. 3A.

At 506, 2D landmarks (such as the 2D landmarks 328A) may be determined from the first 2D image 322A. In accordance with an embodiment, the circuitry 202 may be configured to determine the 2D landmarks 328A from the first 2D image 322A. The determined 2D landmarks 328A may correspond to shape-features of the object of interest. Details of the determination of the 2D landmarks 328A are further provided for example in FIG. 3A.

At 508, 3D landmarks (such as the 3D landmarks 330A) may be extracted from the first 3D shape model 322B of the received dataset 320. In accordance with an embodiment, the circuitry 202 may be configured to extract the 3D landmarks 330A from the first 3D shape model 322B of the received dataset 320. Details of the extraction of the 3D landmarks 330A are further provided for example in FIG. 3A.

At 510, a first error may be computed between the determined 2D landmarks 328A and corresponding 2D locations of the extracted 3D landmarks 330A on the first 2D image 322A, based on an error metric. In accordance with an embodiment, the circuitry 202 may be configured to compute the first error between the determined 2D landmarks 328A and corresponding 2D locations of the extracted 3D landmarks 330A on the first 2D image 322A, based on an error metric. Details of the computation of the first error are further provided for example in FIG. 3B.

At 512, the computed first error may be determined to be above a threshold. In accordance with an embodiment, the circuitry 202 may be configured to determine the computed first error to be above the threshold. Details of the determination of the computed first error to be above the threshold are further provided for example in FIG. 3B.

At 514, the received dataset 320 may be updated by a removal of the first sample 322 from the received dataset 320. In accordance with an embodiment, the circuitry 202 may be configured to update the received dataset 320 by the removal of the first sample 322 from the received dataset 320. The removal may be based on the determination that the computed first error is more than the threshold. Details of the update of the received dataset 320 are further provided for example in FIG. 3B.

At 516, a neural network model (such as the neural network model 402) may be trained on a task of 3D reconstruction from a single 2D image, based on the updated dataset (such as the updated dataset 120). In accordance with an embodiment, the circuitry 202 may be configured to train the neural network model 402 on the task of 3D reconstruction from the single 2D image, based on the updated dataset 120. Details of the training of the neural network model 402 are further provided for example in FIG. 3B. Control may pass to end.

Although the flowchart 500 is illustrated as discrete operations, such as 502, 504, 506, 508, 510, 512, 514 and 516, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate an electronic device (such as the electronic device 102). The instructions may cause the machine and/or computer to perform operations that may include receiving a dataset (such as the dataset 320) comprising a plurality of samples. A first sample (such as the first sample 322) of the plurality of samples may include a first 2D image (such as the first 2D image 322A) of an object of interest, a first 3D shape model (such as the first 3D shape model 322B) of the object of interest, and texture mapping information between the object of interest of the first 2D image 322A and the first 3D shape model 322B. The operations may further include determining 2D landmarks (such as the 2D landmarks 328A) from the first 2D image 322A. The determined 2D landmarks 328A may correspond to shape-features of the object of interest. The operations may further include extracting 3D landmarks (such as the 3D landmarks 330A) from the first 3D shape model 322B of the received dataset 320. The operations may further include computing a first error between the determined 2D landmarks 328A and corresponding 2D locations of the extracted 3D landmarks 330A on the first 2D image 322A, based on an error metric. The operations may further include determining the computed first error to be above a threshold. The operations may further include updating the received dataset 320 by a removal of the first sample 322 from the received dataset 320. The removal may be based on the determination that the computed first error is more than the threshold. The operations may further include training the neural network model 402 on the task of 3D reconstruction from a single 2D image, based on the updated dataset 120.

Exemplary aspects of the disclosure may provide an electronic device (such as the electronic device 102 of FIG. 1) that includes circuitry (such as the circuitry 202). The circuitry 202 may be configured to receive a dataset (such as the dataset 320) comprising a plurality of samples. A first sample (such as the first sample 322) of the plurality of samples may include a first 2D image (such as the first 2D image 322A) of an object of interest, a first 3D shape model (such as the first 3D shape model 322B) of the object of interest, and texture mapping information between the object of interest of the first 2D image 322A and the first 3D shape model 322B. The circuitry 202 may be further configured to determine 2D landmarks (such as the 2D landmarks 328A) from the first 2D image 322A. The determined 2D landmarks 328A may correspond to shape-features of the object of interest. The circuitry 202 may be further configured to extract 3D landmarks (such as the 3D landmarks 330A) from the first 3D shape model 322B of the received dataset 320. The circuitry 202 may be further configured to compute a first error between the determined 2D landmarks 328A and corresponding 2D locations of the extracted 3D landmarks 330A on the first 2D image 322A, based on an error metric. The circuitry 202 may be further configured to determine the computed first error to be above a threshold. The circuitry 202 may be further configured to update the received dataset 320 by a removal of the first sample 322 from the received dataset 320. The removal may be based on the determination that the computed first error is more than the threshold. The circuitry 202 may be further configured to train the neural network model 402 on the task of 3D reconstruction from a single 2D image, based on the updated dataset 120.

In accordance with an embodiment, the error metric may be a Root Mean Square Error (RMSE) metric. In accordance with an embodiment, the first error may be a Root Mean Square Error (RMSE) between the determined 2D landmarks 328A and the corresponding 2D locations of the extracted 3D landmarks 330A on the first 2D image 322A.

In accordance with an embodiment, the trained neural network model 402 may receive, as an input, a second 2D image (such as the second 2D image 404A) of the object of interest. The second 2D image 404A may be a part of an unseen dataset of images of the object of interest. The trained neural network model 402 may further output, based on the input, a second 3D shape model (such as the second 3D shape model 406A) corresponding to the object of interest in the second 2D image 404A.

In accordance with an embodiment, the object of interest may be one of an inanimate object or an animate object. In accordance with an embodiment, the object of interest may be one of a body of a human subject, a face of the human subject, or an anatomical portion different from the body and the face of the human subject.

In accordance with an embodiment, each 3D landmark of the extracted 3D landmarks 330A may include 3D coordinates of the shape-features included in the first 3D shape model 322B.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
      receive a dataset comprising a plurality of samples,
         wherein a first sample of the plurality of samples comprises a first two-dimensional (2D) image of an object of interest, a first three-dimensional (3D) shape model of the object of interest, and texture mapping information between the object of interest of the first 2D image and the first 3D shape model;
      determine 2D landmarks from the first 2D image, wherein the determined 2D landmarks corresponds to shape-features of the object of interest;
      extract 3D landmarks from the first 3D shape model of the received dataset;
      compute a first error between the determined 2D landmarks and corresponding 2D locations of the extracted 3D landmarks on the first 2D image, based on an error metric;
      determine the computed first error to be above a threshold;
      update the received dataset by a removal of the first sample from the received dataset, wherein the removal is based on the determination that the computed first error is more than the threshold; and
      train, based on the updated dataset, a neural network on a task of 3D reconstruction from a single 2D image.

2. The electronic device according to claim 1, wherein the error metric is a Root Mean Square Error (RMSE) metric.

3. The electronic device according to claim 2, wherein the first error is a Root Mean Square Error (RMSE) between the determined 2D landmarks and the corresponding 2D locations of the extracted 3D landmarks on the first 2D image.

4. The electronic device according to claim 1, wherein the trained neural network model:
   receives, as an input, a second 2D image of the object of interest,
      wherein the second 2D image is part of an unseen dataset of images of the object of interest; and
   outputs, based on the input, a second 3D shape model corresponding to the object of interest in the second 2D image.

5. The electronic device according to claim 1, wherein the object of interest is one of an inanimate object or an animate object.

6. The electronic device according to claim 1, wherein the object of interest is one of a body of a human subject, a face of the human subject, or an anatomical portion different from the body and the face of the human subject.

7. The electronic device according to claim 1, wherein each 3D landmark of the extracted 3D landmarks includes 3D coordinates of the shape-features included in the first 3D shape model.

8. A method, comprising:
   receiving a dataset comprising a plurality of samples,
      wherein a first sample of the plurality of samples comprises a first two-dimensional (2D) image of an object of interest, a first three-dimensional (3D) shape model of the object of interest, and texture mapping information between the object of interest of the first 2D image and the first 3D shape model;
   determining 2D landmarks from the first 2D image, wherein the determined 2D landmarks corresponds to shape-features of the object of interest;
   extracting 3D landmarks from the first 3D shape model of the received dataset;
   computing a first error between the determined 2D landmarks and corresponding 2D locations of the extracted 3D landmarks on the first 2D image, based on an error metric;
   determining the computed first error to be above a threshold;
   updating the received dataset by a removal of the first sample from the received dataset, wherein the removal is based on the determination that the computed first error is more than the threshold; and
   training, based on the updated dataset, a neural network on a task of 3D reconstruction from a single 2D image.

9. The method according to claim 8, wherein the error metric is a Root Mean Square Error (RMSE) metric.

10. The method according to claim 9, wherein the first error is a Root Mean Square Error (RMSE) between the determined 2D landmarks and the corresponding 2D locations of the extracted 3D landmarks on the first 2D image.

11. The method according to claim 8, further comprising:
   receiving, by the trained neural network model, a second 2D image of the object of interest as an input,
      wherein the second 2D image is part of an unseen dataset of images of the object of interest; and
   outputting, by the trained neural network model, a second 3D shape model corresponding to the object of interest in the second 2D image, based on the input.

12. The method according to claim 8, wherein the object of interest is one of an inanimate object or an animate object.

13. The method according to claim 8, wherein the object of interest is one of a body of a human subject, a face of the human subject, or an anatomical portion different from the body and the face of the human subject.

14. The method according to claim 8, wherein each 3D landmark of the extracted 3D landmarks includes 3D coordinates of the shape-features included in the first 3D shape model.

15. A non-transitory computer-readable medium having stored thereon computer implemented instructions that, when executed by an electronic device, causes the electronic device to execute operations, the operations comprising:
receiving a dataset comprising a plurality of samples,
wherein a first sample of the plurality of samples comprises a first two-dimensional (2D) image of an object of interest, a first three-dimensional (3D) shape model of the object of interest, and texture mapping information between the object of interest of the first 2D image and the first 3D shape model;
determining 2D landmarks from the first 2D image, wherein the determined 2D landmarks corresponds to shape-features of the object of interest;
extracting 3D landmarks from the first 3D shape model of the received dataset;
computing a first error between the determined 2D landmarks and corresponding 2D locations of the extracted 3D landmarks on the first 2D image, based on an error metric;
determining the computed first error to be above a threshold;
updating the received dataset by a removal of the first sample from the received dataset, wherein the removal is based on the determination that the computed first error is more than the threshold; and
training, based on the updated dataset, a neural network on a task of 3D reconstruction from a single 2D image.

16. The non-transitory computer-readable medium according to claim 15, wherein the error metric is a Root Mean Square Error (RMSE) metric.

17. The non-transitory computer-readable medium according to claim 16, wherein the first error is a Root Mean Square Error (RMSE) between the determined 2D landmarks and the corresponding 2D locations of the extracted 3D landmarks on the first 2D image.

18. The non-transitory computer-readable medium according to claim 15, wherein the operations further comprise:
receiving, by the trained neural network model, a second 2D image of the object of interest as an input,
wherein the second 2D image is part of an unseen dataset of images of the object of interest; and
outputting, by the trained neural network model, a second 3D shape model corresponding to the object of interest in the second 2D image, based on the input.

19. The non-transitory computer-readable medium according to claim 15, wherein the object of interest is one of an inanimate object or an animate object.

20. The non-transitory computer-readable medium according to claim 15, wherein the object of interest is one of a body of a human subject, a face of the human subject, or an anatomical portion different from the body and the face of the human subject.

* * * * *